United States Patent [19]

Metz

[11] 4,445,025

[45] Apr. 24, 1984

[54] LOW MASS FLEXIBLE HEATING MEANS

[75] Inventor: Bruce E. Metz, Wilmington, Del.

[73] Assignee: Athena Controls Inc., Conshohocken, Pa.

[21] Appl. No.: 438,053

[22] Filed: Nov. 1, 1982

[51] Int. Cl.³ .............................................. H05B 3/06
[52] U.S. Cl. .................................... 219/530; 156/499;
156/583.7; 29/460; 29/611; 219/388; 219/528;
219/540; 219/549; 412/900
[58] Field of Search ............... 219/243, 388, 528, 530,
219/540, 549; 38/93, 97; 156/499, 581, 555,
583.1, 583.3, 583.4, 583.7, 583.9; 412/900;
29/458, 460, 611

[56] References Cited

U.S. PATENT DOCUMENTS

| | | | |
|---|---|---|---|
| 2,270,316 | 1/1942 | Kuhn et al. | 38/93 |
| 2,738,603 | 3/1956 | Towne | 38/97 |
| 2,791,668 | 5/1957 | Cowdrey et al. | 219/528 |
| 3,153,140 | 10/1964 | Theodore et al. | 219/549 |
| 3,227,597 | 1/1966 | Wilson | 219/243 X |
| 3,236,174 | 2/1966 | Hutchinson et al. | 219/243 X |
| 3,413,176 | 11/1968 | Port et al. | 156/499 |
| 3,417,229 | 12/1968 | Shomphe et al. | 219/528 |
| 3,493,726 | 2/1970 | Bardeu | 219/443 |
| 4,108,713 | 8/1978 | Weisz | 156/499 |
| 4,353,776 | 10/1982 | Giulie | 156/555 |

FOREIGN PATENT DOCUMENTS 567433 12/1958 Canada ................................. 38/93

Primary Examiner—Volodymyr Y. Mayewsky
Attorney, Agent, or Firm—William E. Cleaver

[57] ABSTRACT

The present invention provides a low mass, flexible heat transfer member which is made of a suitable material to transfer heat, as well as a plurality of independent heat generating members to provide zoned heat along a portion of the length of said heat transfer member. The heat generating members are encased in an electrical insulation material which is secured to the heat transfer member. The consolidated structure, i.e. the heat transfer member and heat generating members constitute a flexible strip. The ends of said flexible strip are actually sections of the heat transfer member and these ends are respectively looped around two pins, or studs, and over the respective loops there is positioned an associated slotted hollow tube. The slotted hollow tube is formed to be located in a base of a machine with which the flexible heating means is used. When the hollow tubes are located in the base, the consolidated structure, made up of said heat transfer members and heat generating members, can be spring loaded to be held in tension which enables the flexible strip to follow an item which is being heated.

5 Claims, 3 Drawing Figures

LOW MASS FLEXIBLE HEATING MEANS

Background

Heretofore heat sealing stations have employed heavy metal blocks which have heating elements and thermocouples located therein. The overall package represented by the heating means and the heavy metal blocks played the role of the heat transfer means. These heavy metal blocks have had a number of undesirable characteristics. First, such heavy metal blocks, which constitute a dense mass of material, have been burdened with the inherent problems of high thermal inertia. It has taken a relatively long time to heat the blocks when the system is operating in the heating mode and even though they have been equipped with a thermocouple, the temperatures of such blocks have tended to overshoot the desired mark and this of course made temperature control difficult. Such blocks (in particular due to the high thermal inertia characteristics), do not provide a good vehicle for zoned heating, which can be advantageously used in packaging techniques. In addition the heavy metal blocks of the prior art are inflexible and can not "follow" the contour of a package or item coming in contact therewith. On the contrary, the package must conform to the configuration of the heavy metal block. Accordingly if the package should be slightly larger than the dimensions between a pair of such heavy metal blocks these packages are often torn. On the other hand, if the package or the item dimension is slightly less than the dimension between a pair of such heavy metal blocks, the package is often not properly sealed. As the block wears from constant rubbing of packages or items coming in contact therewith there develops and uneven surface from which the heat is transferred. Since such metal blocks are inflexible and cannot "follow" the contour of the packages or items, it has been found that this uneven surface condition also leads to improper sealing.

The present invention is a low mass flexible heating means which overcomes the undesirable aspects of the prior art heavy block heating means.

Summary

The present invention employs a thin metal strip (sometimes referred to as a membrane) as the heat transfer means. Mounted on one side of this metal strip is a plurality of electrical resistance elements which in the preferred embodiment are formed in a meandering path. The electrical resistance elements, when connected to a power source, generate heat which is transferred through the thin metal strip to be applied to an item to be heated, such as a package which is to be sealed. Each electrical resistance is designed to be independently connected to a different power source so that different amounts of heat can be transferred to different sections of the thin metal strip. Hence different amounts of heat can be applied to a package (or whatever is being heated) at different sections of the thin metal strip as the package travels along and in contact with the metal strip. The electrical resistor elements are encased in an electrical insulation material and the insulation material with the electrical resistance elements therein is secured to the metal strip. The insulation material is also flexible so that the entire combination of the metal strip, the bonding material and the electrical resistance elements provides a flexible package. The insulation material does extend along the entire metal strip and hence the ends of the flexible package are in fact sections of the thin metal strip. Each end of the metal strip is looped around a pin and a slotted hollow tube is slipped over the looped metal strip and the pin. In the foregoing manner the flexible heating means is locked onto the hollow slotted tubes. The two slotted hollow tubes are readily mountable in a packaging machine or elsewhere by providing apertures in the housing of such a machine at the heating station or sealing station. On the other hand, such a flexible heating means is easily removable.

The features and objects of the present invention will be better understood in view of the following description taken in conjunction with the drawings wherein.

Figure 1:
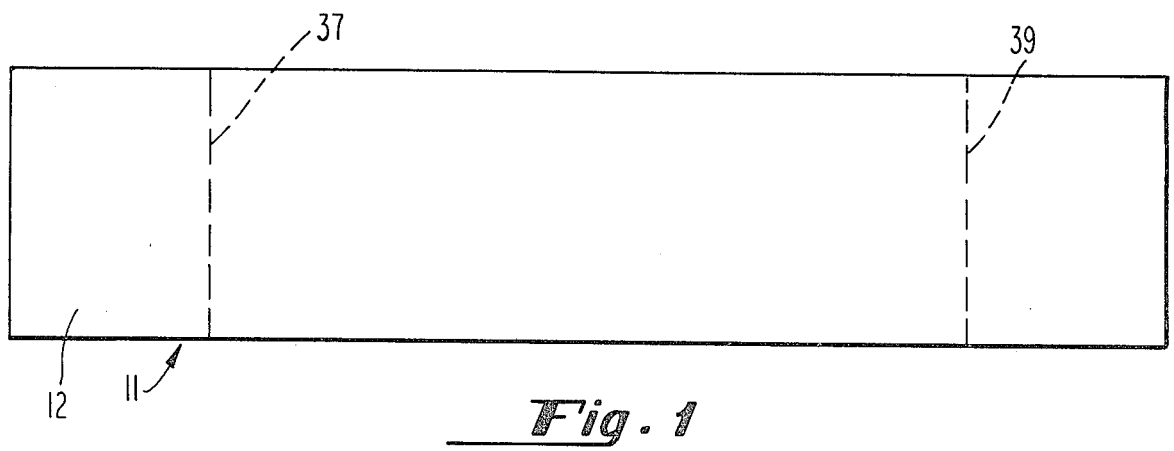
FIG. 1 shows the low mass flexible heating means from the heat transfer member side.

In FIG. 1 there is shown a thin metal strip 11 which constitutes the heat transfer member of the present low mass flexible heating means. In the preferred embodiment the metal strip 11 is phosphor bronze or brass. It should be understood that other forms of metal such as stainless steel, copper or aluminum could be used. It should also be understood that in some operations the heat transfer member 11 is coated with an abrasion resistant material 12, such as plasma sprayed nickel tungsten, or chrome oxide, or aluminum oxide wear facing material. Such materials prevent the heat transfer member from wearing due to the rubbing of items thereagainst when such items are having heat transferred thereto. It should be further noted that the spray technique is adjusted so that there are large voids remaining when the material, such as nickel tungsten, firms up. Teflon material, or the like, is further deposited in the voids. While the nickel-tungsten and the like are low friction good wear face surfaces, with the Teflon added the wear face surface is of a very low friction characteristic. In FIG. 1 the metal strip 11 is shown fully extended and not in its wrap around position. In the preferred embodiment the thickness of the metal is 0.003 inches but it should be understood that other thicknesses can be used provided such metal is formed to be flexible and of low mass.

Figure 2:
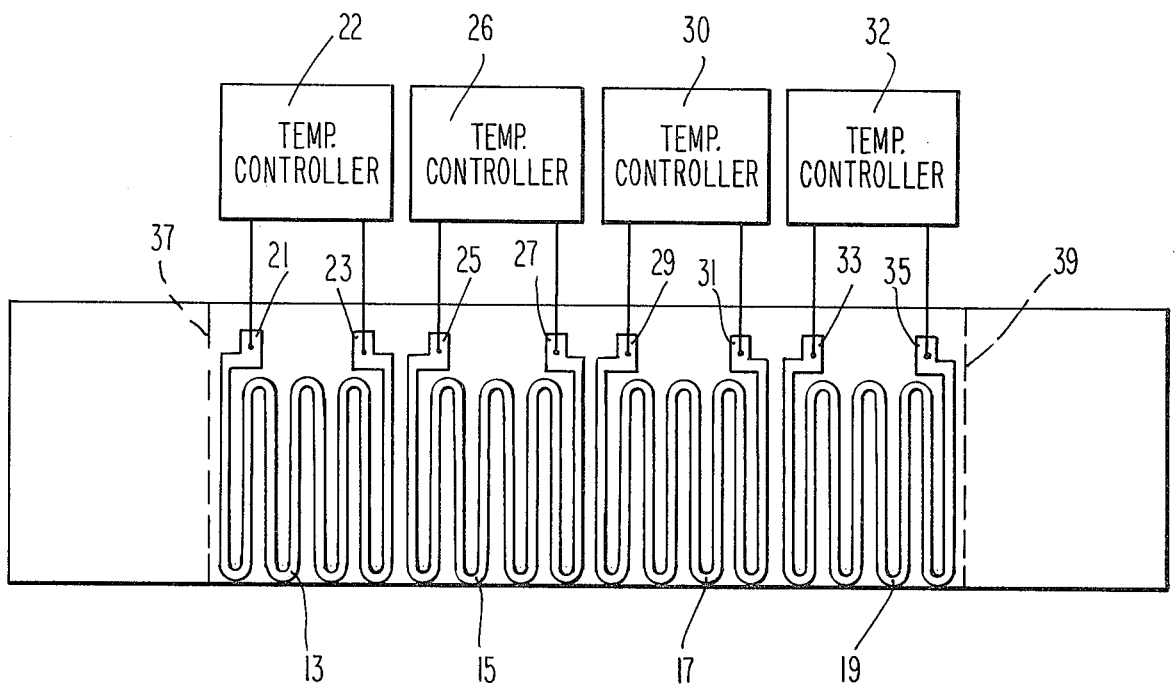
FIG. 2 shows the reverse side of FIG. 1 wherein the plurality of resistance heating elements is shown.

FIG. 2 shows the reverse side of FIG. 1. In FIG. 2 there is shown a plurality of electrical resistance elements 13, 15, 17, and 19. Each of the electrical resistance elements is fabricated from nickel iron alloy and is made by etching the patterns in the resistance alloy from a thin strip stock. As can be seen in FIG. 2 each of the resistor elements is formed to end in two terminals such as terminals 21, 23, 25, 27 29, 31, 33, and 35. By having the electrical resistor elements 13, 15, 17, and 19 end in their own terminal elements, each of the resistor elements can be independently energized from temperature controllers such as controllers 22, 26, 30 and 32. Therefore each of the resistance elements can provide an amount of heat which is different from its adjacent electrical resistance element. This mode of operation, which is identified as zoned heat, provides a great advantage to a heat application operation.

To better appreciate the advantage of zoned heat, it should be understood that in order to seal the material, which is to be sealed, such material should be heated to a point where it is partially "melted", or tacky, or adhesible, or fusible. The partially melted material layers are simultaneously heated and pressed together, and in effect, fuse into one another to form, upon cooling, a bond or seal. The task is to render the material in the fusible state by the proper amount of heat without destroying the material by too much heat. It should be borne in mind that the material, which is to be sealed, is wrapped around a package and that package acts as a heat sink. The package conducts heat away from the source. It follows that when a "cold" package first enters the heat station it acts to conduct heat from the source more rapidly than it conducts heat further along the excursion as it passes through the heat station. Accordingly, in the prior art systems, the amount of heat which is present, (in the layers of material to be adhesed, or fused, at the beginning of the excursion through the heat station), is relatively small when compared to the heat available at the initial position of the heat station. If we consider the profile of the heat present, in a prior art system, in the sealable material as that material travels through the heat station, we find that it is not a flat profile, as would be desirable. Instead the operating profile becomes a ramp shaped pattern which rises (i.e. the amount of resident heat increases) as the sealable material moves through the heating station. The material which is to be sealed must be rendered partially melted within a "thermal window." If the applied heat is too great the material is destroyed and if the applied heat is too little the material will not become adhesible, or fusible. The upper and lower limits of the ramp profile described above must fit within the thermal window and these constraints have given rise to problems in the prior art. The solution does not lie in providing a higher heat to overcome the initial "cold" state problem with prior art equipment because with such equipment the "heat present", at the end of the excursion through the heat station, is destructive, i.e. the ramp profile dictated that the high end is beyond the limits of the thermal window. In the prior art the problem has been dealt with by extending the heat exposure time, by either extending the length of the heat station or by transporting the packages at a relatively slow rate.

By providing zoned heat, the profile of the effective heat on the package is reasonably constant or can be made reasonably constant and this insures a good sealing procedure. In addition by being able to change the profile of the effective heat, due to the zoned heating, the packaging machine can be made to operate at relatively high speeds since time does not become the controlling factor but the effect of the heat becomes the controlling factor. In addition, zoned heating permits the heating station to be flexible to accommodate different types of materials or different types of seals.

As can be gleaned further from FIG. 2 the plurality of electrical resistance elements are encased in a transparent electrical insulating material and this is signified by the dashed edge lines 37 and 39 shown in FIG. 2. In the preferred embodiment the material is Kapton insulator material, manufactured by Dupont Co. The Kapton encasement is secured to the metal strip by a silicone adhesive. This encasement can be better appreciated from FIG. 3 which is a top view showing some depth to the materials making up the package although the depths are exaggerated for purposes of illustration. In the preferred embodiment the encasement of the transparent insulation material 38 is approximately 0.003 inches thick. It should be further noted in FIG. 2 that the resistance elements are formed in a meandering path which provides for expansion and prevents buckling.

As can be also noted in FIG. 2 there is a distance or a length of the metal strip 11 between the ends of the insulation material 37 and 39 and that strip of metal is formed to be looped over a pin on each end. A slotted hollow tube is located over each loop and pin to secure the package to the pins and the associated hollow tubes. This arrangement will be better understood from a consideration of FIG. 3.

Figure 3:
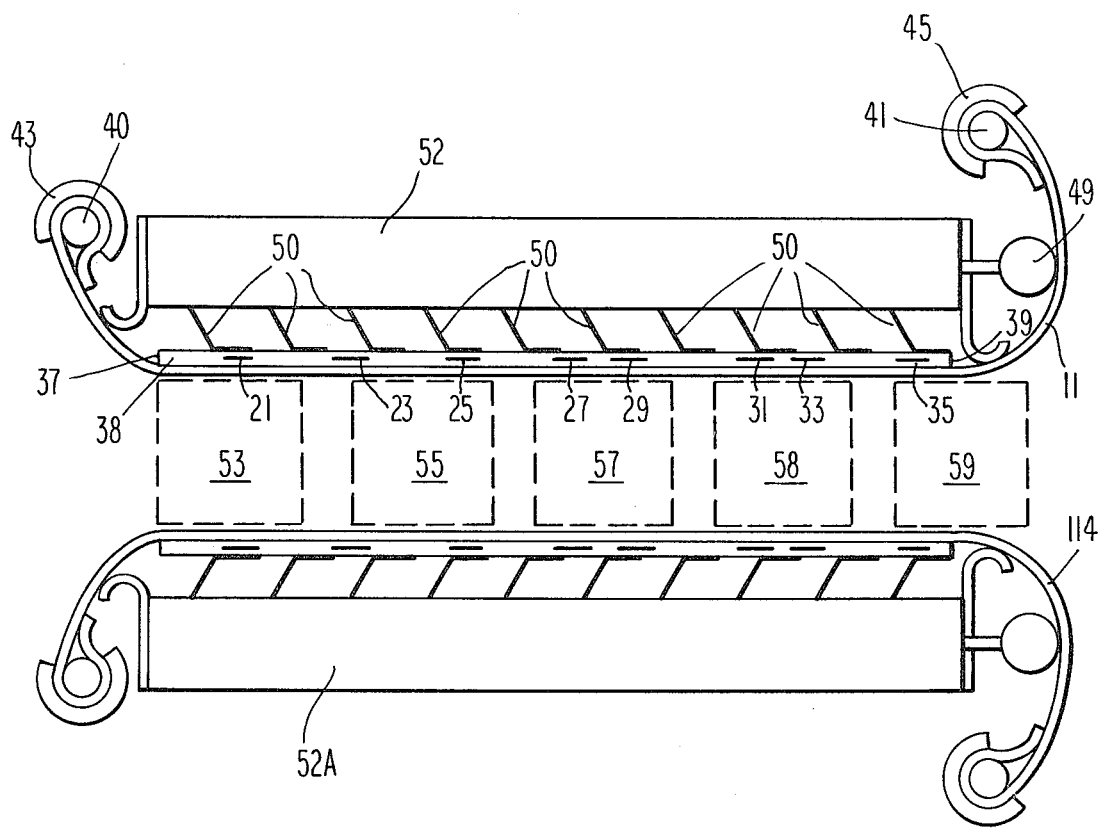
FIG. 3 is a top view showing the flexible heating means mounted and held in tension.

In FIG. 3 there is shown the metal strip 11 as well as the insulation material 38 which is secured by the silicon adhesive to the reverse side of the metal strip 11. It will be noted in FIG. 3 that the metal strip 11 is looped around the pins 40 and 41 and that over the loop in the pin there are respectively located the slotted hollow tubes 43 and 45. By placing the hollow slotted tubes 43 and 45 over the looped ends of the metal strip, the metal strip is now locked in position so that if the heating means, or the metal strip 11, is pushed by the spring loaded stud or bar 49, the hollow slotted tubes being located in apertures in the base of the machine will hold the metal strip 11 and therefore hold the flexible heating means in tension, but in a relatively fixed position. It should be understood that the base is fixed and that the blocks 52 and 52A are fixed members of the base.

In a preferred use of the present device in addition to the bar 49, spring loading the flexible heating means into tension in a longitudinal sense, the flexible heating means has a plurality of leaf springs which are mounted to segmentally provide pressure in a vertical direction as viewed in the drawing, orthogonally to the direction of pull provided by the bar 49. By having the tension and in the longitudinal and vertical directions, the flexible heating means is able to follow the contour of any item passing therealong and in contact therewith.

For instance, if we consider that the items 53, 55, 57, 58, and 59, shown in phantom, are cigarette packages then the ends of the cigarette packages, as they move through the heating station will be coming in contact with the heat transfer member 11. The flexibility of the heat transfer member along with the flexibility of the insulation material and the electrical resistance elements, will permit the flexible heating means to follow the contour of the packages. The segmented pressures of the leaf springs so enables the flexible heating means to continually seek contact with the items passing therealong without disruptively impeding such items. Because of the zoned heating feature of the present flexible heating means, when cigarette packages enter the sealing station, and are in the position shown by the cigarette package 53, a large amount of heat will be applied to the ends of the package to overcome the "cold" state of the package entering the sealing station. Lesser amounts of heat are applied at the positions at which the package 55, 57, 58, and 59 are shown. If the machine is to be run at a higher speed then a profile of the effective heat can be determined and each of the electrical resistance elements can be arranged to provide more or less heat to effect the necessary heating profile for the packages. It should be understood that while there are shown only four electrical resistance elements in both FIG. 2 and FIG. 3, there could be more or less, depending upon the needs of the operation. Since the flexible heating means is readily interchangeable the number of electrical resistance elements can be readily interchangeable.

Since the present low mass flexible heating means is in fact a low mass device none of the problems that are inherent with high thermal inertia are present in the device being described herein. The present low mass flexible heating means has been found empirically to enable packaging machines to run at speeds that were heretofore considered unattainable.

I claim:

1. A flexible zoned heating means comprising in combination: flexible heat transfer means formed of a low mass metal strip having first and second sides; a plurality of electrical resistance means, each formed into a meandering path and each formed to have independent terminal means; flexible electrical insulating means formed to substantially encase each of said plurality of electrical resistance means and formed to leave each of said terminal means available for connection to a different source of electrical current, said flexible electrical insulating means secured to said second side of said flexible heat transfer means whereby each electrical resistance means defines a heatable zone on said first side of said flexible heat transfer means; a plurality of electrical current generating means with each connected to a different one of said plurality of electrical resistance means to transmit electrical current thereto to cause heat to be generated, whereby when each of two of said electrical current generators transmits a different amount of electrical current to its connected electrical resistance means, the heat generated along said heat transfer means, through its first side, is different for each zone defined by said electrical resistance means conducting different valued electrical currents.

2. A flexible zoned heating means according to claim 1 wherein each of said electrical current generating means is transmitting a different amount of electrical current and whereby for each electrical resistance means there is provided a zone of different heat along said first side of said heat transfer means.

3. A flexible zoned heating means according to claim 1 wherein there is further included a plurality of leaf springs disposed to push said flexible electrical insulating means against said flexible heat transfer means whereby said flexible heat transfer means follows the contour of an item being transported therealong for heat transfer thereto.

4. A flexible zoned heating means according to claim 1 wherein said first side of said flexible heat transfer means has a wear facing means secured thereto.

5. A flexible zoned heating means according to claim 4 wherein said wear facing means is sprayed nickel tungsten which is formed to have voids therein and wherein said voids have friction reducing material located therein.

* * * * *